United States Patent
Breitbach et al.

(10) Patent No.: US 11,057,818 B1
(45) Date of Patent: Jul. 6, 2021

(54) STEALTH POSITION-LOCATION INFORMATION FOR HIGH VALUE NODES

(71) Applicant: Rockwell Collins, Inc., Cedar Rapids, IA (US)

(72) Inventors: Joshua Breitbach, Anamosa, IA (US); Justin W. Ehm, Cedar Rapids, IA (US); TJ T. Kwon, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 24 days.

(21) Appl. No.: 16/736,434

(22) Filed: Jan. 7, 2020

(51) Int. Cl.
| | |
|---|---|
| *H04W 40/02* | (2009.01) |
| *H04W 84/18* | (2009.01) |
| *H04W 40/32* | (2009.01) |
| *H04W 4/029* | (2018.01) |
| *H04W 40/28* | (2009.01) |
| *H04W 40/24* | (2009.01) |

(52) U.S. Cl.
CPC .......... *H04W 40/02* (2013.01); *H04W 4/029* (2018.02); *H04W 40/246* (2013.01); *H04W 40/248* (2013.01); *H04W 40/28* (2013.01); *H04W 40/32* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 6,845,091 B2 | 1/2005 | Ogier et al. | |
| 7,242,671 B2 | 7/2007 | Li et al. | |
| 7,573,835 B2 | 8/2009 | Sahinoglu et al. | |
| 7,698,463 B2 | 4/2010 | Ogier et al. | |
| 7,719,989 B2 | 5/2010 | Yau | |
| 8,179,837 B2* | 5/2012 | Kulkarni | H04W 24/08 370/328 |
| 8,495,738 B2 | 7/2013 | Burnham et al. | |

(Continued)

FOREIGN PATENT DOCUMENTS

| | | |
|---|---|---|
| EP | 2743726 A1 | 6/2014 |
| WO | 2019045767 A1 | 3/2019 |

OTHER PUBLICATIONS

Kong, Jiejun et al., "An Identity-free and on Demand Routing Scheme against Anonymity Threats in Mobile Ad-hoc Networks", in IEEE Transactions on Mobile Computing, vol. 6, No. 8, pp. 888-902, Aug. 2007.

(Continued)

*Primary Examiner* — Brian S Roberts
(74) *Attorney, Agent, or Firm* — Suiter Swantz pc llo

(57) ABSTRACT

A multi-node communication network may include a plurality of nodes, which may include normal value nodes, a clusterhead node, and a high value node. Each of the plurality of nodes may include a communication interface and a controller. The high value node may be defined as high value relative to the normal value nodes during mission data fill. The high value node may be configured to locate the clusterhead node, register the high value node's membership to the clusterhead node, and send position-location information (PLI) to the clusterhead node during registration. Upon receipt of a PLI request, each of the normal value nodes may be configured to send current PLI to the clusterhead node. Upon receipt of the PLI request, the high value node may remain silent.

15 Claims, 13 Drawing Sheets

(56) References Cited

U.S. PATENT DOCUMENTS

| | | | |
|---|---|---|---|
| 8,630,291 B2 | 1/2014 | Shaffer et al. | |
| 8,942,197 B2 | 1/2015 | Rudnick et al. | |
| 9,143,431 B2 | 9/2015 | Mohapatra et al. | |
| 9,179,475 B2 | 11/2015 | Koleszar et al. | |
| 9,338,138 B2 | 5/2016 | Xu et al. | |
| 10,097,469 B2 | 10/2018 | Hui et al. | |
| 10,979,348 B1* | 4/2021 | Kwon | H04L 45/32 |
| 2003/0204623 A1* | 10/2003 | Cain | H04L 45/00 |
| | | | 709/241 |
| 2008/0242374 A1 | 10/2008 | Alexander | |
| 2016/0021013 A1* | 1/2016 | Vasseur | H04L 47/20 |
| | | | 370/235 |
| 2016/0359572 A1 | 12/2016 | Zhou et al. | |
| 2018/0145876 A1* | 5/2018 | Palankar | H04L 67/2842 |
| 2018/0146489 A1 | 5/2018 | Jin et al. | |
| 2019/0098625 A1 | 3/2019 | Johnson et al. | |
| 2019/0285722 A1 | 9/2019 | Markhovsky et al. | |

OTHER PUBLICATIONS

Liu, Jun et al., "Performance Evaluation of Anonymous Routing Protocols in MANETs", in IEEE Wireless Communications and Networking Conference, 2006. WCNC 2006., Las Vegas, NV, 2006, pp. 646-651.

Wang, Z. et al., "Mutual Anonymous Communications: A New Covert Channel Based on Splitting Tree MAC", IEEE INFOCOM 2007—26th IEEE International Conference on Computer Communications, Barcelona, 2007, pp. 2531-2535 (Abstract).

\* cited by examiner

STEALTH POSITION-LOCATION INFORMATION FOR HIGH VALUE NODES

CROSS-REFERENCE TO RELATED APPLICATIONS

The present application is related to U.S. patent application Ser. No. 16/698,230, filed Nov. 27, 2019, which is incorporated by reference in its entirety.

BACKGROUND

Mobile ad-hoc networks (MANETs) are known in the art as quickly deployable, self-configuring wireless networks with no pre-defined network topology. Each communication node within a MANET is presumed to be able to move freely. In the context of MANETs and other multi-node communication networks, it is often desirable to know the position of each communication node within the network. As such, position-location information (PLI) is regarded as a fundamental concept of operation (CONOP) requirement.

In traditional multi-node communication networks, PLI data is transmitted at regular intervals from each communication node to every other communication node within the network. However, this traditional PLI distribution system exhibits several shortfalls. First, if a PLI data packet of a communication node fails (e.g., is not successfully delivered), the remaining communication nodes of the network must wait until the next time interval that the PLI data packet will be re-sent in order to update the PLI of that communication node. Additionally, the requirement for each communication node to distribute PLI to every other communication node within the network results in excessive network congestion and overhead. The excessive overhead is compounded by the mobility of communication nodes and soft-state nature of PLI. Furthermore, since each communication node participates in the distribution of PLI data at regular intervals, traffic within the network may be directly proportional to the size of the network (e.g., number of communication nodes within the multi-node network). In this regard, threat receivers may be able to estimate and/or determine the size of the network by monitoring network traffic, thereby leading to security concerns.

In today's deployed military communications networks, PLI is used to help provide situational awareness to the radio users. Specifically, the users need to know the location of their counterparts in order to coordinate attack plans, safely call for airstrikes, or provide assistance. Because this information pinpoints the location of soldiers or vehicles in the field, it is also of significant value to the opposition forces if they can intercept it. Methods exist today to help protect this information while in being communication; however, these methods do not account for certain factors. Specifically, PLI transmission today assumes every node in the network is of equal value. In actuality, this typically is not true. Some nodes may be radios installed in attritable Unmanned Aerial Vehicles (UAV) while others may be communications gateways installed in expensive ground vehicles. When transmitting PLI in today's networks, high value nodes are at the same risk of exposure to the opposition force as normal value nodes. Additionally, the frequency with which PLI is exchanged between nodes in today's networks increases the exposure risk through higher probability of detection (identification of transmissions) and interception (circumventing of current PLI protections).

SUMMARY

In one aspect, embodiments of the inventive concepts disclosed herein are directed to a multi-node communication network. The multi-node communication network may include a plurality of nodes, which may include normal value nodes, a clusterhead node, and a high value node. Each of the plurality of nodes may include a communication interface and a controller. The high value node may be defined as high value relative to the normal value nodes during mission data fill. The high value node may be configured to locate the clusterhead node, register the high value node's membership to the clusterhead node, and send position-location information (PLI) to the clusterhead node during registration. Upon receipt of a PLI request, each of the normal value nodes may be configured to send current PLI to the clusterhead node. Upon receipt of the PLI request, the high value node may remain silent.

In a further aspect, embodiments of the inventive concepts disclosed herein are directed to method of operating a multi-node communication network. The method may include: providing a plurality of nodes including normal value nodes, a clusterhead node, and a high value node, wherein each of the plurality of nodes includes a communication interface and a controller, wherein the high value node is defined as high value relative to the normal value nodes during mission data fill; locating, by the high value node, the clusterhead node; registering, by the high value node, the high value node's membership to the clusterhead node; sending, by the high value node, position location information (PLI) to the clusterhead node during registration; upon receipt of a PLI request, sending, by each of the normal value nodes, current PLI to the clusterhead node; and upon receipt of the PLI request, remaining silent by the high value node.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
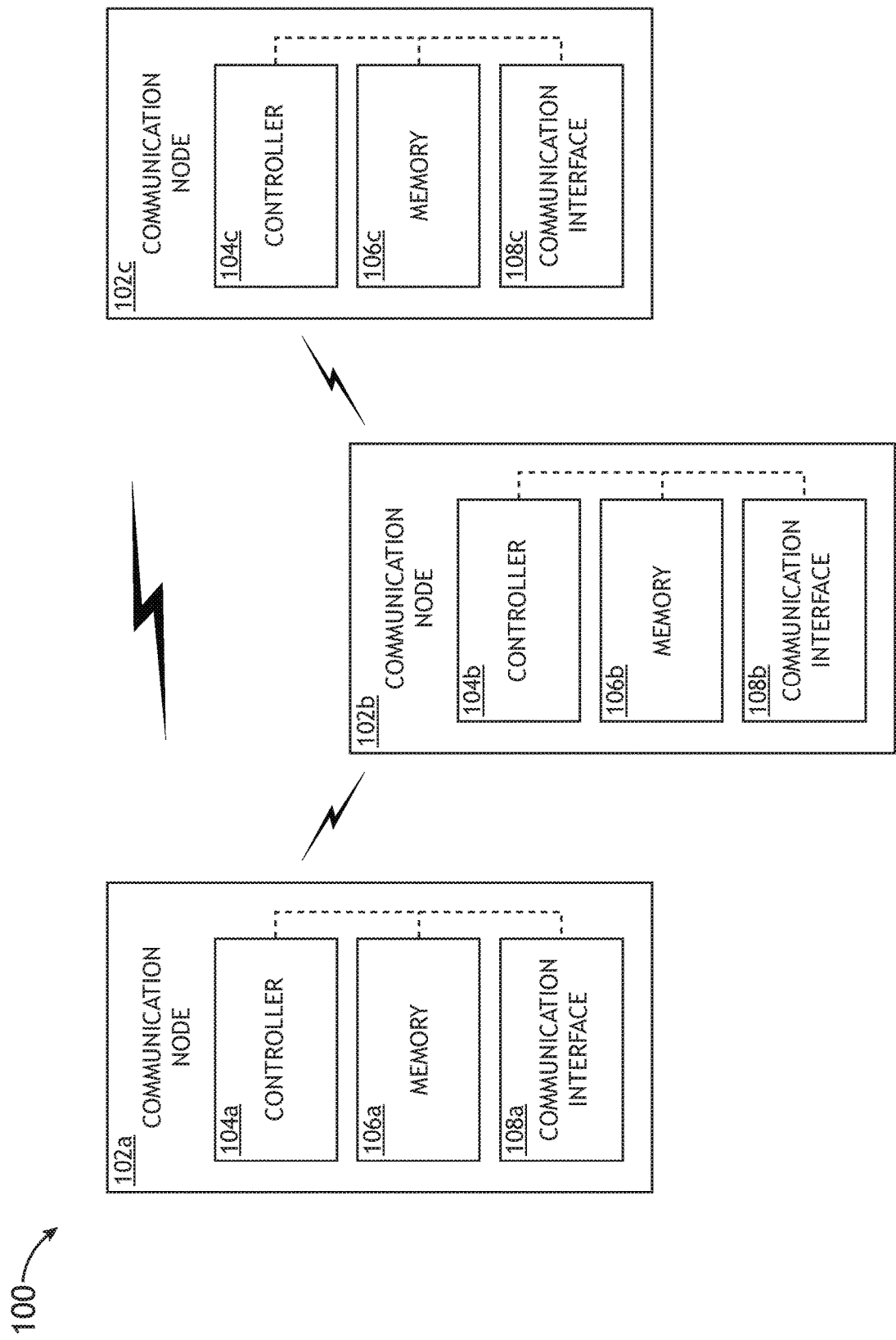
FIG. 1 illustrates a multi-node communication network, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Position-location information (PLI) is regarded as a fundamental concept of operation (CONOP) requirement. In traditional multi-node communication networks, PLI data is transmitted at regular intervals from each communication node to every other communication node within the network. However, this traditional PLI distribution system exhibits several shortfalls. First, if a PLI data packet of a communication node fails, the remaining communication nodes of the network must wait until the next time interval that the PLI data packet will be re-sent in order to update the PLI of that communication node.

Additionally, the requirement for each communication node to distribute PLI to every other communication node within the network results in excessive network congestion and overhead. The excessive overhead is compounded by the mobility of communication nodes and soft-state nature of PLI. Increasing the number of communication nodes within the multi-node communication network increases the network overhead, thereby posing network scalability issues. In particular, for a given bandwidth, the more communication nodes within the network, the less frequently PLI data may be transmitted by each communication node. Furthermore, since each communication node participates in the distribution of PLI data, traffic within the network may be directly proportional to the size of the network (e.g., number of communication nodes within the multi-node network). In this regard, threat receivers may be able to estimate and/or determine the size of the network by monitoring network traffic, thereby leading to security concerns.

Accordingly, some embodiments include a method of providing additional protection to high value nodes within a network by reducing PLI transmissions and typically only providing approximate PLI for the high value nodes, thus making probability of detection and intercept by an enemy much lower. Some embodiments are directed to a system and method for distributing PLI data throughout a multi-node communication network. Some embodiments are directed to a communication node of a multi-node communication network which is configured to collect PLI data from a plurality of communication nodes, and relay collected PLI data back to a requesting communication node. Some embodiments may be directed to a system and method for confirming PLI data is effectively transmitted throughout a multi-node communication network.

It is contemplated herein that some embodiments of the present disclosure may provide a more efficient and reliable distribution of PLI data throughout a multi-node communication network. For example, by concentrating PLI data within clusterhead nodes of a multi-node communication network, some embodiments may decrease network overhead, verify effective PLI data distribution, and alleviate network scalability issues associated with traditional PLI exchange systems and techniques.

FIG. 1 illustrates a multi-node communication network 100, in accordance with one or more embodiments of the present disclosure. In embodiments, the multi-node communication network 100 may include a plurality of communication nodes 102. For example, the multi-node communication network 100 may include a first communication node 102a, a second communication node 102b, and a third communication node 102c.

The multi-node communication network 100 may include any multi-node communication network known in the art. For example, the multi-node communication network 100 may include a mobile ad-hoc network (MANET) in which each communication node 102 within the multi-node communication network is able to move freely and independently. In additional and/or alternative embodiments, one or more communication nodes 102 within the multi-node communication network 100 may be stationary. In embodiments, the one or more communication nodes 102 may include any communication node known in the art which may be communicatively coupled. In this regard, the one or more communication nodes 102 may include any communication node known in the art for transmitting/transceiving data packets. For example, the one or more communication nodes 102 may include, but are not limited to, radios, mobile phones, smart phones, tablets, smart watches, laptops, and the like.

Each communication node 102 of the one or more communication nodes 102a, 102b, 102c may include, but is not limited to, a respective controller 104 (e.g., controller 104a, 104b, 104c, etc.), memory 106 (e.g., memory 106a, 106b, 106c, etc.), and communication interface 108 (e.g., communication interface 108a, 108b, 108c, etc.).

The controller 104 provides processing functionality for at least the communication node 102 and can include any number of processors, micro-controllers, circuitry, field programmable gate array (FPGA) or other processing systems, and resident or external memory for storing data, executable code, and other information accessed or generated by the communication node 102. The controller 104 can execute one or more software programs embodied in a non-transitory computer readable medium (e.g., memory 106) that implement techniques described herein. The controller 104 is not limited by the materials from which it is formed or the processing mechanisms employed therein and, as such, can be implemented via semiconductor(s) and/or transistors (e.g., using electronic integrated circuit (IC) components), and so forth.

The memory 106 can be an example of tangible, computer-readable storage medium that provides storage functionality to store various data and/or program code associated with operation of the communication node 102/ controller 104, such as software programs and/or code segments, or other data to instruct the controller 104, and possibly other components of the communication node 102, to perform the functionality described herein. Thus, the memory 106 can store data, such as a program of instructions for operating the communication node 102, including its components (e.g., controller 104, communication interface 108, etc.), and so forth. It should be noted that while a single memory 106 is described, a wide variety of types and combinations of memory (e.g., tangible, non-transitory memory) can be employed. The memory 106 can be integral with the controller 104, can comprise stand-alone memory, or can be a combination of both. Some examples of the memory 106 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 108 can be operatively configured to communicate with components of the communication node 102. For example, the communication interface 108 can be configured to retrieve data from the controller 104 or other devices (e.g., other nodes 102), transmit data for storage in the memory 106, retrieve data from storage in the memory 106, and so forth. The communication interface 108 can also be communicatively coupled with the controller 104 to facilitate data transfer between components of the communication node 102 and the controller 104. It should be noted that while the communication interface 108 is described as a component of the communication node 102, one or more components of the communication interface 108 can be implemented as external components communicatively coupled to the communication node 102 via a wired and/or wireless connection. The communication node 102 can also include and/or connect to one or more input/output (I/O) devices. In embodiments, the communication interface 108 includes or is coupled to a transmitter, receiver, transceiver, physical connection interface, or any combination thereof.

It is contemplated herein that the communication interface 108 of a communication node 102 may be configured to communicatively couple to additional communication interfaces 108 of additional communication nodes 102 of the multi-node communication network 100 using any wireless communication techniques known in the art including, but not limited to, GSM, GPRS, CDMA, EV-DO, EDGE, WiMAX, 3G, 4G, 4G LTE, 5G, WiFi protocols, radio frequency (RF), LoRa, and the like.

In embodiments, the controller 104 of a communication node 102 is configured to carry out various steps and functions of the present disclosure. The controller 104 may be configured to: receive a position-location information (PLI) request packet, via the communication interface 108, originating from a control communication node 102a; transmit the PLI request packet in a first iteration, via the communication interface 108, to a group of one or more secondary communication nodes 102; receive at least one PLI report packet from a first sub-set of one or more secondary communication nodes 102 of the group of one or more secondary communication nodes 102 throughout a first time interval ($\Delta t_1$); re-transmit the PLI request packet in an $(N-1)^{th}$ iteration, via the communication interface 108, to the group of one or more secondary communication nodes 102; receive at least one PLI report packet from a second sub-set of one or more secondary communication nodes 102 of the group of one or more secondary communication nodes 102 throughout an $(N-1)^{th}$ time interval ($\Delta t_{N-1}$); re-transmit the PLI request packet in an $N^{th}$ iteration, via the communication interface 108, to the group of one or more secondary communication nodes 102; determine that no PLI report packets have been received from a new secondary communication node 102 within an $N^{th}$ time interval ($\Delta t_N$); and transmit a PLI publish packet, via the communication interface 108, to the control communication node 102a, the PLI publish packet including PLI information of one or more acknowledged secondary nodes 102.

Figure 2:
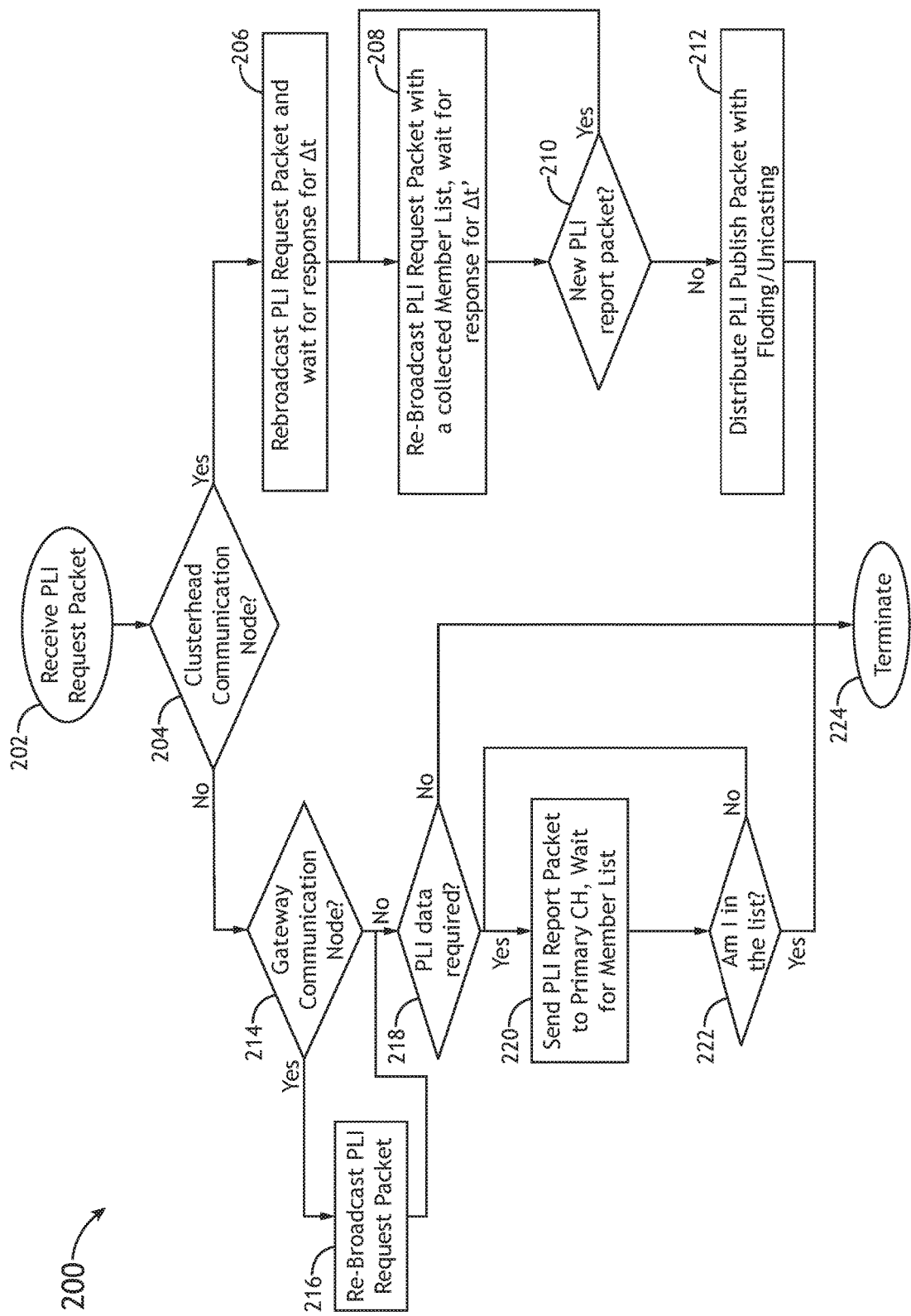
FIG. 2 illustrates a flowchart of a method for distributing position-location information (PLI) data within a multi-node communication network, in accordance with one or more embodiments of the present disclosure.

Each of these steps carried out by the controller 104 of a communication node 102 of the multi-node communication network 100 may be further shown and understood with reference to FIG. 2.

FIG. 2 illustrates a flowchart of a method 200 for distributing position-location information (PLI) data within a multi-node communication network 100, in accordance with one or more embodiments of the present disclosure. It is noted herein that the steps of method 200 may be implemented all or in part by multi-node communication network 100. It is further recognized, however, that the method 200 is not limited to the multi-node communication network 100 in that additional or alternative system-level embodiments may carry out all or part of the steps of method 200.

In embodiments, FIG. 2 illustrates a method 200 for transmitting PLI data within a multi-node communication network 100 by concentrating PLI data within particular communication nodes 102 (e.g., clusterhead communication nodes) of the multi-node communication network 100.

In a step 202, a communication node 102 of a multi-node communication network receives a PLI request packet. This may be further understood with reference to FIG. 3A.

Figure 3A:
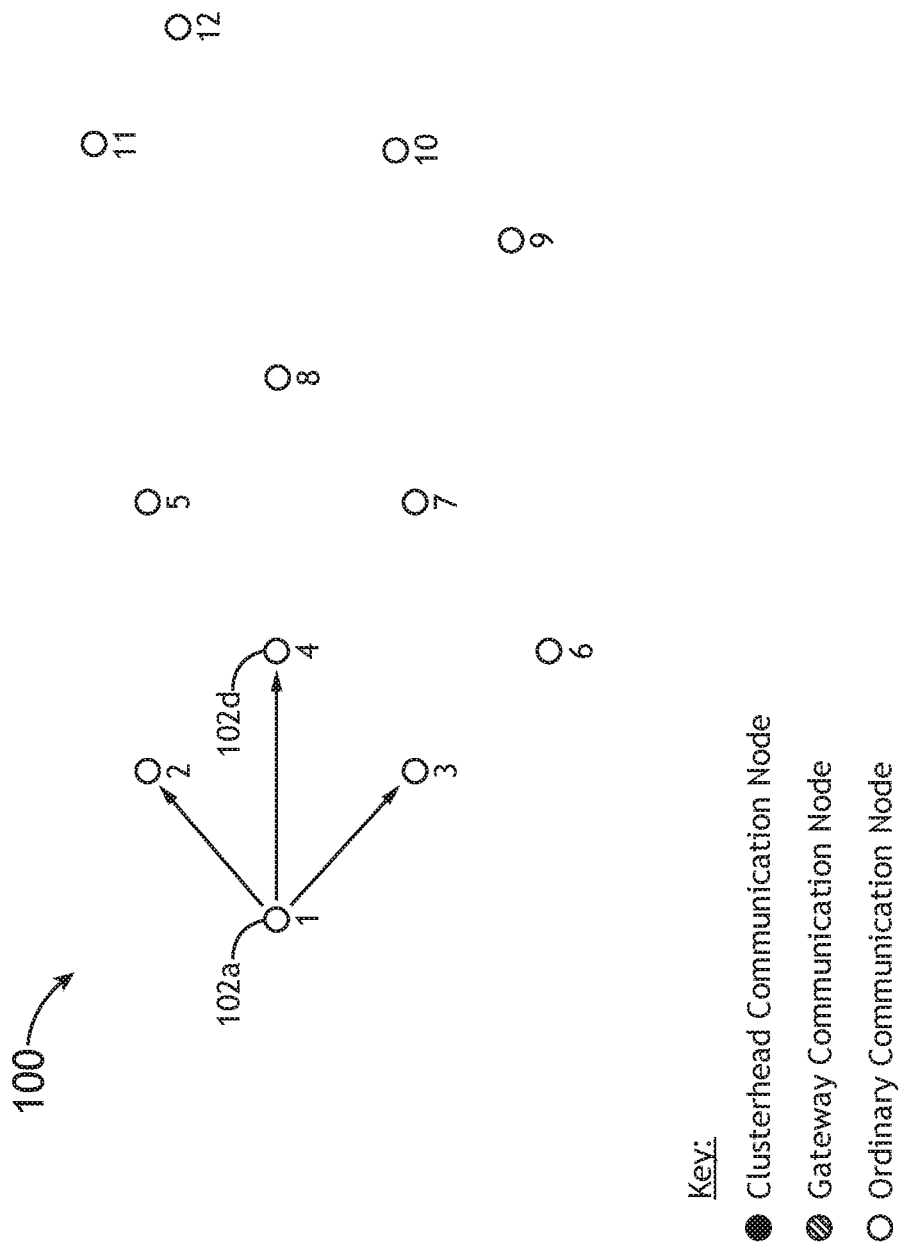
FIG. 3A illustrates a PLI request packet transmitted within a multi-node communication network from a control communication node to a clusterhead communication node, in accordance with one or more embodiments of the present disclosure.

FIG. 3A illustrates a PLI request packet transmitted within a multi-node communication network 100 from a control communication node 102a to a clusterhead communication node 102d, in accordance with one or more embodiments of the present disclosure.

In embodiments, the control communication node 102a may "request" to receive PLI data from other communication nodes 102 within the multi-node communication network 100 by transmitting the PLI request packet, as shown in FIG. 3A. PLI data may be requested and/or transmitted within a multi-node communication network 100 at regular intervals, irregular intervals, on a needed basis (e.g., manual request), and the like. For example, the control communication node 102a may transmit PLI request packets at regular intervals. By way of another example, the control communication node 102a may transmit a PLI request packet upon receipt of one or more control signals received from a user via a user interface of the control communication node 102a.

The control communication node 102a may include a "control point," a "source communication node 102a," a "collection communication node 102a," a "collector communication node 102a," or other communication node 102 where there is a desire to aggregate PLI data for the various communication nodes 102a-102n of the multi-node communication network 100. It is further noted herein, however, that any communication node 102 which initiates a PLI collection process (e.g., initiates method 200) by transmitting a PLI request packet may be regarded as a control communication node 102 (e.g., collector communication node 102a).

In some embodiments, the PLI request packet may be transmitted through the multi-node communication network 100 via an efficient packet flooding with passive clustering procedure (EFPC) (e.g., ZOEF), in which each communication node 102 is configured to receive the PLI request packet and relay the data packet to other communication nodes 102 within the multi-node communication network 100. In embodiments, the PLI request packet transmitted via a packet flooding procedure may be used to construct the clustering structure on the fly. In this regard, relay communication nodes 102 may be configured to receive a PLI request packet and relay (e.g., transmit) the PLI request packet to one or more communication nodes 102 within the multi-node communication network 100 via a packet flooding procedure. The packet flooding procedure may be utilized to transmit the PLI request packet to each communication node 102 within the multi-node communication network 100.

In embodiments, each communication node 102 of the multi-node communication network 100 may be configured to implement data packet bookkeeping in order to facilitate packet flooding without infinite retransmissions. For example, each communication node 102 may be configured to add a unique identifier (e.g., MAC address, IP address, and the like) to the header of the PLI request packet upon relaying the PLI request packet in order to indicate the PLI request packet was transmitted through the respective communication node 102. In this regard, a PLI request packet arriving at a particular communication node 102n may include identifying data (e.g., unique identifiers) in the header of the PLI request packet indicating the number of communication nodes 102 each respective PLI request packet was transmitted through from the control communication node 102a to the respective communication node 102l (e.g., a "hop count"). In embodiments, the controller 104 of each communication node 102 is configured to identify a time-stamp of each received and/or transmitted data packet (e.g., PLI request packet), and store the time-stamps in memory 106.

Furthermore, the controller 104 of each communication node 102 may be configured to store routing tables to various other communication nodes 102 in memory 106. For the purposes of the present disclosure, the term "routing table" may be used to refer to a soft-state local list of neighboring nodes communicatively coupled to the respective communication node 102 "upstream" and "downstream" from the communication node 102. Routing tables may be constructed and stored in memory of each communication node 102 based on unique identifiers and hop counts stored in the header of received data packets.

In additional and/or alternative embodiments, the PLI request packet transmitted by the control communication node 102a may include a list of one or more requesting characteristics of communication nodes 102 for which the control communication node 102a is requesting PLI data. In embodiments, requesting characteristics may include any characteristics of communication nodes 102 which may be used to identify which communication nodes 102 are required to send their PLI data. In this regard, all communication nodes 102 which meet each requesting characteristics within the PLI request packet may be required to report their PLI data. Conversely, communication nodes 102 which do not meet one or more requesting characteristics within the PLI request packet may not be required to report their PLI data, and may therefore refrain from transmitting PLI report packets. Requesting characteristics may be stored in the header of the PLI request packet and/or in the body of the PLI request packet.

For example, if the control communication node 102a wants to receive PLI data of every node within the multi-node communication network 100, the PLI data packet may include a unique identifier associated with every communication node 102 and/or may include a requesting characteristic of "All Communication Nodes." By way of another example, if the control communication node 102a wants to know the location of every clusterhead communication node 102, a requesting characteristic may include "All Clusterhead Communication Nodes." Requesting characteristics may include, but are not limited to, clustering statuses, location (e.g., all communication nodes 102 within a specified geofenced area), altitude (e.g., all communication nodes 102 above/below a specified altitude), speed, heading, mobile or immobile (e.g., only mobile communication nodes 102), above/below a specified rank, distance above/below a specified threshold distance from the control communication node 102a, and the like.

By way of another example, a requesting characteristic may be targeted towards communication nodes 102 which have changed their location more than a threshold amount since the last time they transmitted their PLI data, such that only communication nodes 102 which have changed position more than a threshold distance are required to report their new PLI data.

It is noted herein that including requesting characteristics within the PLI request packet may reduce the frequency of PLI reporting, and may therefore reduce the overall traffic within the multi-node communication network 100. Additionally, due to the fact that not every single communication node 102 may be required to respond to each PLI request packet (dependent upon requesting characteristics), the overall traffic of the multi-node communication network 100 may not be directly proportional to the size of the network, thereby preventing threat receivers from determining and/or estimating the size of the network by monitoring network traffic.

It is further noted that data packets may be transmitted through the multi-node communication network 100 using any efficient packet flooding procedure known in the art. For example, PLI request packets may be transmitted through the multi-node communication network 100 utilizing efficient flooding with passive clustering (EFPC), Zero Overhead Efficient Flooding (ZOEF), and the like.

In some embodiments, the efficient packet flooding procedure may include forming a "clustering structure" within which communication nodes 102 are identified according to their "clustering status." For example, a communication node 102 may be classified, clustered, or otherwise identified according to a clustering status including an "initial node" clustering status, an "ordinary node" clustering status, a "gateway node" clustering status, or a "clusterhead node" clustering status. For the purposes of the present disclosure, the term "clusterhead communication node" may be used to refer to a communication node 102 which collects PLI data from a group of one or more additional communication nodes 102. Similarly, the term "secondary communication node" may be used to refer to gateway communication nodes 102, initial communication nodes 102, and/or ordinary communication nodes 102 which transmit PLI data (e.g., PLI report packets) to clusterhead communication nodes 102.

A clustering structure or other hierarchy structure may be formed according to any criteria or characteristics of the communication nodes 102 and/or multi-node communication network 100 known in the art. For example, the clustering status of each communication node 102 may be determined based on the number and/or type of communication nodes 102 communicatively coupled to the respective communication node 102. The clustering status of each communication node 102 may be stored in memory 106. An efficient packet flooding procedure which forms a clustering structure is described in further detail in U.S. patent application Ser. No. 16/369,398, filed Mar. 29, 2019, entitled ZERO-OVERHEAD EFFICIENT FLOODING, which is incorporated herein by reference in the entirety.

It is noted herein that the clustering structure (e.g., clustering hierarchy) of the present disclosure is not to be regarded as a limitation of the present disclosure, unless noted otherwise herein. In this regard, it is contemplated herein that any 2-hop clustering hierarchy including two or more types/statuses of communication nodes 102 may be utilized to implement embodiments of the present disclosure.

In a step 204, it is determined whether the communication node 102 which received the PLI request packet is a clusterhead communication node 102. Upon answering step 204 in the affirmative (e.g., step 204="YES"), method 200 may proceed to step 206. In a step 206, the clusterhead communication node 102 may re-broadcast the PLI request packet in a first instance, and wait for responses throughout a first time interval ($\Delta t_1$). This may be further understood with reference to FIG. 3B.

Figure 3B:
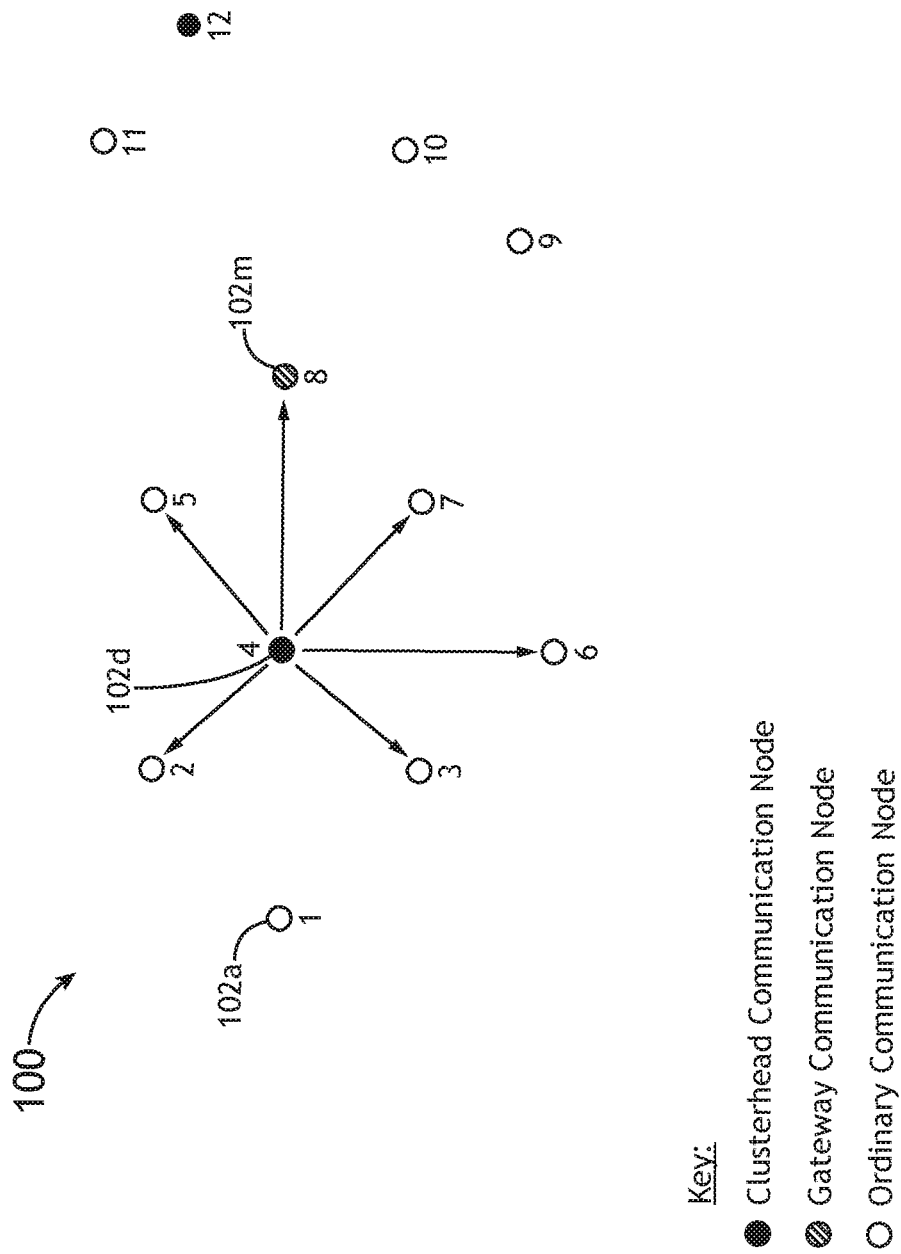
FIG. 3B illustrates a PLI request packet re-transmitted by a clusterhead communication node, in accordance with one or more embodiments of the present disclosure.

FIG. 3B illustrates a PLI request packet re-transmitted by a clusterhead communication node 102d, in accordance with one or more embodiments of the present disclosure. Upon receiving the PLI request packet (step 202), as shown in FIG. 3A, the communication node 102d may be configured to determine whether it is a clusterhead communication node 102 (step 204). For example, the controller 104d of the clusterhead communication node 102d may reference a clustering status stored in memory 106, and determine it is a clusterhead communication node 102d (e.g., step 204="YES").

Subsequently, the controller 104d of the clusterhead communication node 102d may be configured to transmit the PLI request packet, via the communication interface 108d, to a group of one or more secondary communication nodes 102. For example, the clusterhead communication node 102d may be configured to transmit the PLI request packet, via the communication interface 108d, to a group of secondary communication nodes 102a, 102b, 102c, 102d, 102e, 102f, 102g, and 102h. It is noted herein that the control communication node 102a may be included within and/or excluded from the group of secondary communication nodes. For example, in embodiments where the control communication node 102a is included within the group of secondary communication nodes, the clusterhead communication node 102d may transmit a PLI request packet to the control communication node 102a. Conversely, in embodiments where the control communication node 102a is excluded from the group of secondary communication nodes, the clusterhead communication node 102d may refrain from transmitting a PLI request packet to the control communication node 102a, as shown in FIG. 3B. It is noted herein that the control communication node 102a, which is requesting PLI data, should previously know its own PLI. Thus, including the control communication node 102a is within the group of secondary communication nodes may be redundant in some embodiments, and may therefore be avoided, as shown in FIG. 3B.

The clusterhead communication node 102d may be configured to transmit (e.g., broadcast) the PLI request packet via any communication protocol known in the art including, but not limited to, an efficient flooding communication protocol. For the purposes of the present disclosure, the term "secondary communication nodes" may be used to refer to communication nodes which are not clusterhead communication nodes. In this regard, the term "secondary communication nodes" may be used to refer to gateway communication nodes 102, initial communication nodes 102, or ordinary communication nodes 102.

As will be discussed in further detail herein, the clusterhead communication node 102d may be configured to re-transmit the PLI request packet on multiple occasions/instances. Accordingly, the first transmission of the PLI request packet (FIG. 3B) may be referred to as transmission of the PLI request packet in a first instance. Similarly, the second transmission of the PLI request packet may be referred to as transmission of the PLI request packet in a second instance, the $(N-1)^{th}$ transmission of the PLI request packet may be referred to as transmission of the PLI request packet in an $(N-1)^{th}$ instance, and the $N^{th}$ transmission of the PLI request packet may be referred to as transmission of the PLI request packet in an $N^{th}$ instance.

In the first instance of transmitting the PLI request packet in step 206 (FIG. 3B), the clusterhead communication node 102d may be configured to collect PLI report packets for a first time interval ($\Delta t_1$). This may be further understood with reference to FIG. 3C.

Figure 3C:
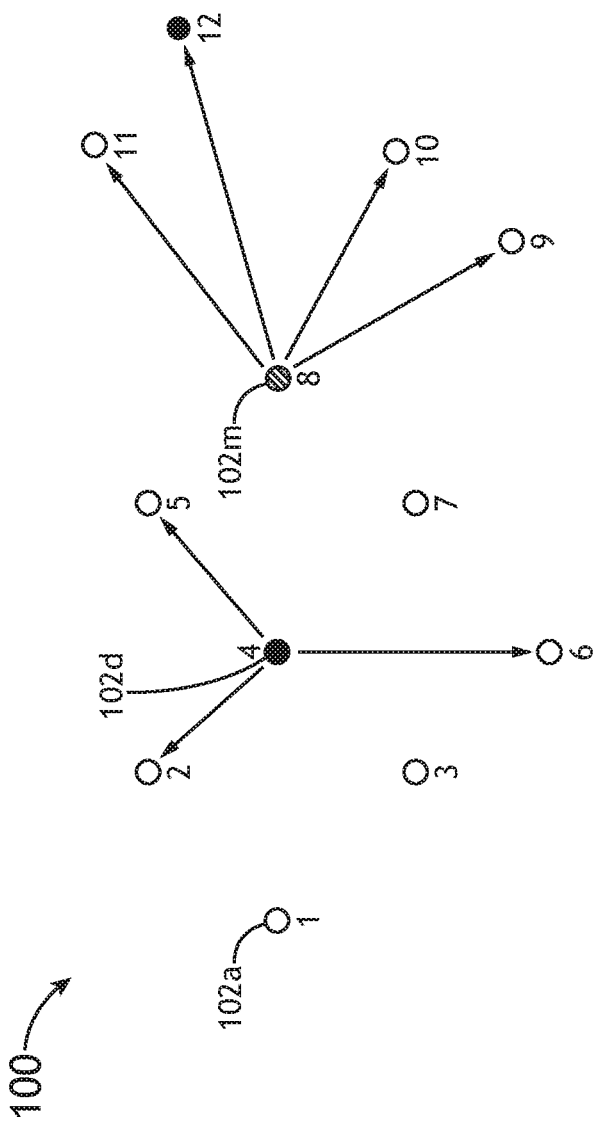
FIG. 3C illustrates PLI report packets collected by a clusterhead node from a plurality of secondary communication nodes, in accordance with one or more embodiments of the present disclosure.

FIG. 3C illustrates PLI report packets collected by a clusterhead node 102d from a plurality of secondary communication nodes 102, in accordance with one or more embodiments of the present disclosure.

In embodiments, the controller 104d of the clusterhead communication node 102d may be configured to receive one or more PLI report packets from the group of secondary communication nodes 102 (e.g., communication nodes 102b, 102c, 102e, 102f, 102g, 102h) throughout a first time interval ($\Delta t_1$). In embodiments, the first time interval may commence upon transmission of the PLI request packet in the first iteration, and may be stored in memory 106d.

As will be discussed in further detail herein, the group secondary communication nodes 102 (e.g., communication nodes 102b, 102c, 102e, 102f, 102g, 102h) may be configured to receive the PLI request packet from the clusterhead communication node 102d via communication interfaces 108. In instances where PLI data is requested from the respective receiving communication nodes 102 (as indicated by the PLI request packet), the secondary communication nodes 102 may be configured to transmit a PLI report packet to the clusterhead communication node 102d, via communication interface 108, in response to the PLI request packet.

Dependent upon characteristics of the multi-node communication network 100 (e.g., topology, traffic, noise, jamming) and/or characteristics of the surrounding environment (e.g., weather conditions, terrestrial interference), one or more PLI request packets transmitted by the clusterhead communication node 102d and/or one or more PLI report packets transmitted by the group of secondary nodes 102b-102h may not be successfully delivered. In this regard, throughout a given time interval (e.g., first time interval ($\Delta t_1$)) a clusterhead communication node 102d may only receive PLI report packets from a sub-set of secondary communication nodes 102 the larger group of secondary communication nodes 102. For example, as shown in FIG. 3C, the clusterhead communication node 102d may receive PLI report packets from a first sub-set of secondary communication nodes (e.g., communication nodes 102b, 102e, 102f) out of the overall group of secondary communication nodes (e.g., communication nodes 102b, 102c, 102e, 102f, 102g, 102h).

In embodiments, PLI report packets may include data packets which contain positional data indicative of a geographical position of the transmitting communication node 102. The positional information may be stored in the header and/or body of the respective PLI report packets. For example, the PLI report packet transmitted by the secondary communication node 102b may include positional data indicative of the geographical position of the secondary communication node 102b. By way of another example, the PLI report packet transmitted by the secondary communication node 102e may include positional data indicative of the geographical position of the secondary communication node 102e. Positional information may be conveyed by any techniques known in the art including, but not limited to, geographical coordinates, altitude, and the like. Positional information may further include, but is not limited to, velocity, acceleration, heading, and the like.

PLI report packets may further include unique identifiers associated with each respective transmitting secondary communication node 102. As noted previously herein, unique identifiers may include, but are not limited to, MAC addresses, IP addresses, and the like. By including unique identifiers and positional information within the PLI report packets, the controller 104d of the clusterhead communication node 102d may be able to decipher which positional information is associated with each respective secondary communication node 102.

In embodiments, the controller 104d of the clusterhead communication node 102d may be configured to keep track of each secondary communication node 102d from which it has received a PLI report packet. In this regard, the communication node 102d may be configured to form a "member list," wherein the member list includes a list of secondary communication nodes 102 which previously transmitted a PLI report packet to the clusterhead communication node 102d. Secondary communication secondary communication nodes 102 which previously and successfully transmitted a PLI report packet to the clusterhead communication node 102d may generally be referred to as "acknowledged" secondary communication nodes 102.

For example, as shown in FIG. 3C, the controller 104d of the clusterhead communication node 102d may be configured to form a member list including a list of acknowledged secondary communication nodes 102. In the example shown in FIG. 3C, the acknowledged secondary communication nodes 102 include secondary communication nodes 102b, 102e, and 102f. In embodiments, the member list may include a list of unique identifiers (e.g., MAC addresses, IP addresses) associated with each acknowledged communication node. For example, the member list may include a first unique identifier associated with secondary communication node 102b, a second unique identifier associated with secondary communication node 102e, and a third unique identifier associated with secondary communication node 102f. In embodiments, the controller 104d may be configured to store positional data (e.g., geographical position data) and unique identifiers of acknowledged secondary communication nodes 102 in memory 106d.

Upon expiration of the first time interval ($\Delta t_1$) (e.g., after collecting PLI report packets throughout the first time interval ($\Delta t_1$)), method 200 may proceed to step 208. In a step 208, the clusterhead communication node 102d may re-broadcast (e.g., re-transmit) the PLI request packet with a collected member list. This may be further understood with reference to FIG. 3D.

It is noted herein that at least one of Communication Node 9, 10, 11, or 12 may additionally include a clusterhead communication node, as shown in FIG. 3C. It is contemplated herein that each clusterhead communication node 102 within the multi-node communication network may perform the various steps 206-212. In this regard, the Communication Node 12 may be configured to execute method 200 (e.g., steps 204-212) upon receiving the PLI request packet in step 202, as described previously herein.

Figure 3D:
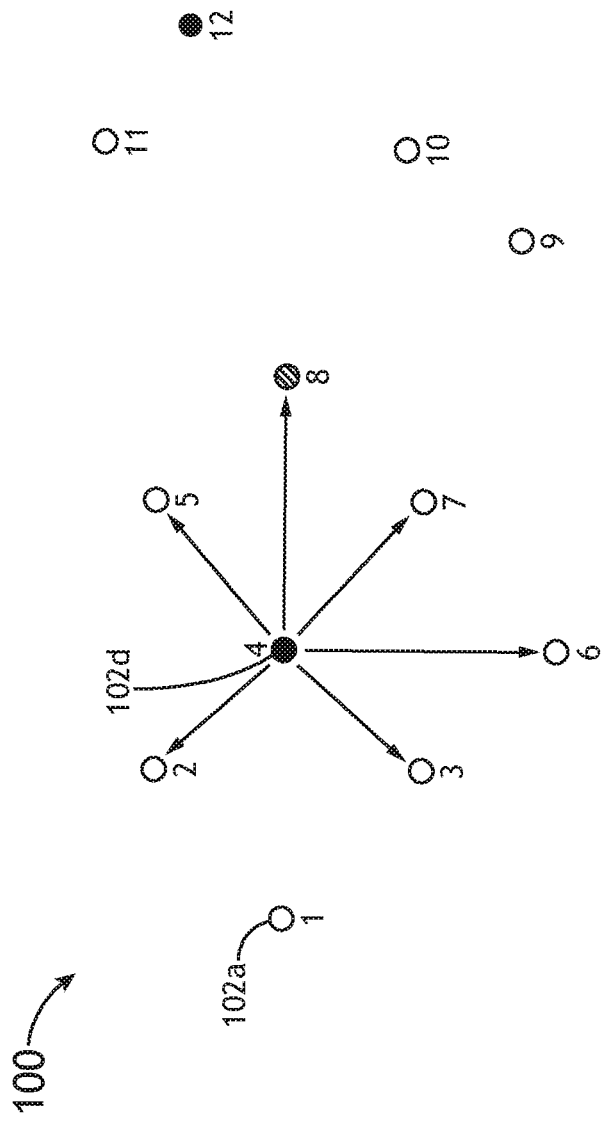
FIG. 3D illustrates a PLI request packet re-transmitted by a clusterhead communication node, in accordance with one or more embodiments of the present disclosure.

FIG. 3D illustrates a PLI request packet re-transmitted by a clusterhead communication node 102d, in accordance with one or more embodiments of the present disclosure.

In embodiments, the controller 104d of the clusterhead communication node 102d may be configured to re-transmit the PLI request packet in an $(N-1)^{th}$ iteration, via the communication interface 108d, to the group of one or more secondary communication nodes. For example, as shown in FIG. 3D, the clusterhead communication node 102d may be configured to re-transmit the PLI request packet in a second iteration to the secondary communication nodes 102b, 102c, 102e, 102f, 102g, 102h. The PLI request packet may be transmitted via a packet flooding procedure.

When re-transmitting the PLI request packet after the first iteration (e.g., during the second iteration, third iteration . . . , $(N-1)^{th}$ iteration, and $N^{th}$ iteration), the re-transmitted PLI request packet may include the member list of acknowledged secondary communication nodes. In this regard, PLI request packet re-transmitted during the second iteration through the $N^{th}$ iteration may indicate which secondary communication nodes have successfully transmitted PLI data to the clusterhead communication node 102d.

For example, in FIG. 3D, the clusterhead communication node 102d may re-transmit the PLI request packet in a second iteration to the group of secondary communication nodes 102b, 102c, 102e, 102f, 102g, 102h. The re-transmitted PLI request packet may include the member list of acknowledged secondary communication nodes 102 stored in memory 106d. For instance, the re-transmitted PLI request packet may include unique identifiers for each acknowledged secondary communication node 102 of the member list. In this example, the member list within the PLI request packet may include unique identifiers associated with the secondary communication nodes 102b, 102f, and 102e, indicating that secondary communication nodes 102b, 102f, and 102e previously and successfully transmitted PLI data to the clusterhead communication node 102d.

By including a member list with the re-transmitted PLI request packet, secondary communication nodes 102 within the group of one or more secondary communication nodes 102 (e.g., communication nodes 102b, 102c, 102e, 102f, 102g, 102h) may be configured to identify whether they are included within the member list. In other words, by referencing the member list within the re-transmitted PLI request packet, secondary communication nodes 102 may be configured to identify whether their PLI data was successfully delivered to the clusterhead communication node 102d. This will be discussed in greater detail herein.

Figure 3E:
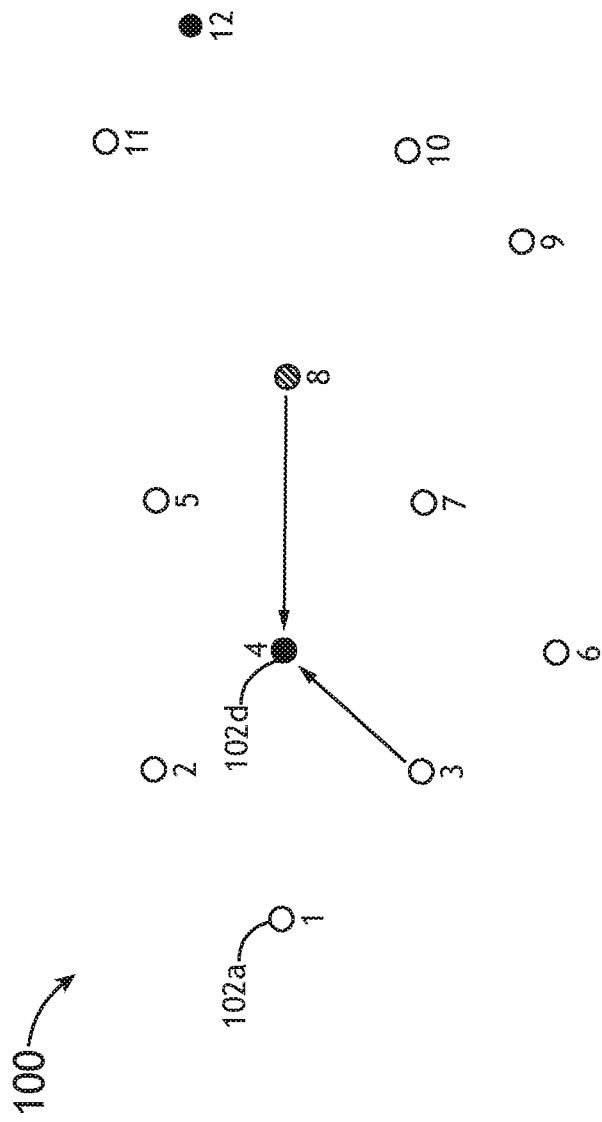
FIG. 3E illustrates PLI report packets collected by a clusterhead node from a plurality of secondary communication nodes, in accordance with one or more embodiments of the present disclosure.

FIG. 3E illustrates PLI report packets collected by a clusterhead node 102d from a plurality of secondary communication nodes 102, in accordance with one or more embodiments of the present disclosure.

After re-transmitting the PLI request packet in an $(N-1)^{th}$ iteration, the controller 104d of the clusterhead communication node 102d may be configured to collect PLI report packets for an $(N-1)^{th}$ time interval. The $(N-1)^{th}$ time interval may commence upon re-transmission of the PLI request packet in the $(N-1)^{th}$ iteration, and may be stored in memory 106d. For example, upon re-transmitting the PLI request packet in a second iteration (FIG. 3D), the controller 104d of the clusterhead communication node 102d may be configured to collect PLI report packets for a second time interval. For instance, as shown in FIG. 3E, the clusterhead communication node 102d may receive PLI report packets from secondary communication nodes 102h and 102c.

The PLI report packets received from secondary communication nodes 102c and 102h may include positional data and unique identifiers associated with the respective secondary communication nodes 102c and 102h. The controller 104d of the clusterhead communication node 102d may be configured to store received positional data and unique identifiers in memory 106d. In embodiments, the controller 104d may be further configured to update the member list of acknowledged secondary communication nodes 102 stored in memory 106d. For example, upon receiving PLI report packets from secondary communication nodes 102c and 102h, the controller 104d may be configured to add unique identifiers associated with secondary communication nodes 102c and 102h to the member list, and store the updated member list in memory 106d.

In some embodiments, the time intervals for which the controller 104d collects PLI data may become shorter. For example, in some embodiments, the second time interval $(\Delta t_2)$ may be less than the first time interval $(\Delta t_1)$ (e.g., $\Delta t_2 < \Delta t_1$). By way of another example, a third time interval $(\Delta t_3)$ associated with a third iteration may be less than the second time interval $(\Delta t_2)$ (e.g., $\Delta t_3 < \Delta t_2$). Generally speaking, an $N^{th}$ time interval $(\Delta t_N)$ may be less than an $(N-1)^{th}$ first time interval $(\Delta t_{N-1})$ (e.g., $\Delta t_N < \Delta t_{N-1}$). In this regard, the controller 104d may be configured to collect PLI report packets for smaller and smaller time intervals for increasing number of iterations re-transmitting the PLI request packets.

Upon expiration of the second time interval $(\Delta t_2)$ and/or $(N-1)^{th}$ time interval $(\Delta t_{N-1})$ (e.g., after collecting PLI report packets throughout the second time interval $(\Delta t_2)$ and/or $(N-1)^{th}$ time interval $(\Delta t_{N-1})$), method 200 may proceed to step 210.

In a step 210, the clusterhead communication node 102d may determine whether any new PLI report packets have been received. For example, after receiving PLI report packets from secondary communication nodes 102b, 102e, 102f during the first time interval (FIG. 3C), and receiving PLI report packets from secondary communication nodes 102c, 102h during the second time interval (FIG. 3E), the controller 104d may be configured to determine that at least one new PLI report packet from a new secondary communication node 102 has been received. In some embodiments, the controller 104d may be configured to identify new PLI report packets by comparing various versions of the member list (e.g., compare member list after first iteration to member list after second iteration).

In this example, the controller 104d may determine that the clusterhead communication node 102d received one or more new PLI report packets from one or more new secondary communication nodes (e.g., step 210="YES"). Thus, method 200 may proceed back to step 208. In step 208, the clusterhead communication node 102d re-broadcasts (e.g., re-transmits) the PLI request packet the updated member list. This may be further understood with reference to FIG. 3F.

Figure 3F:
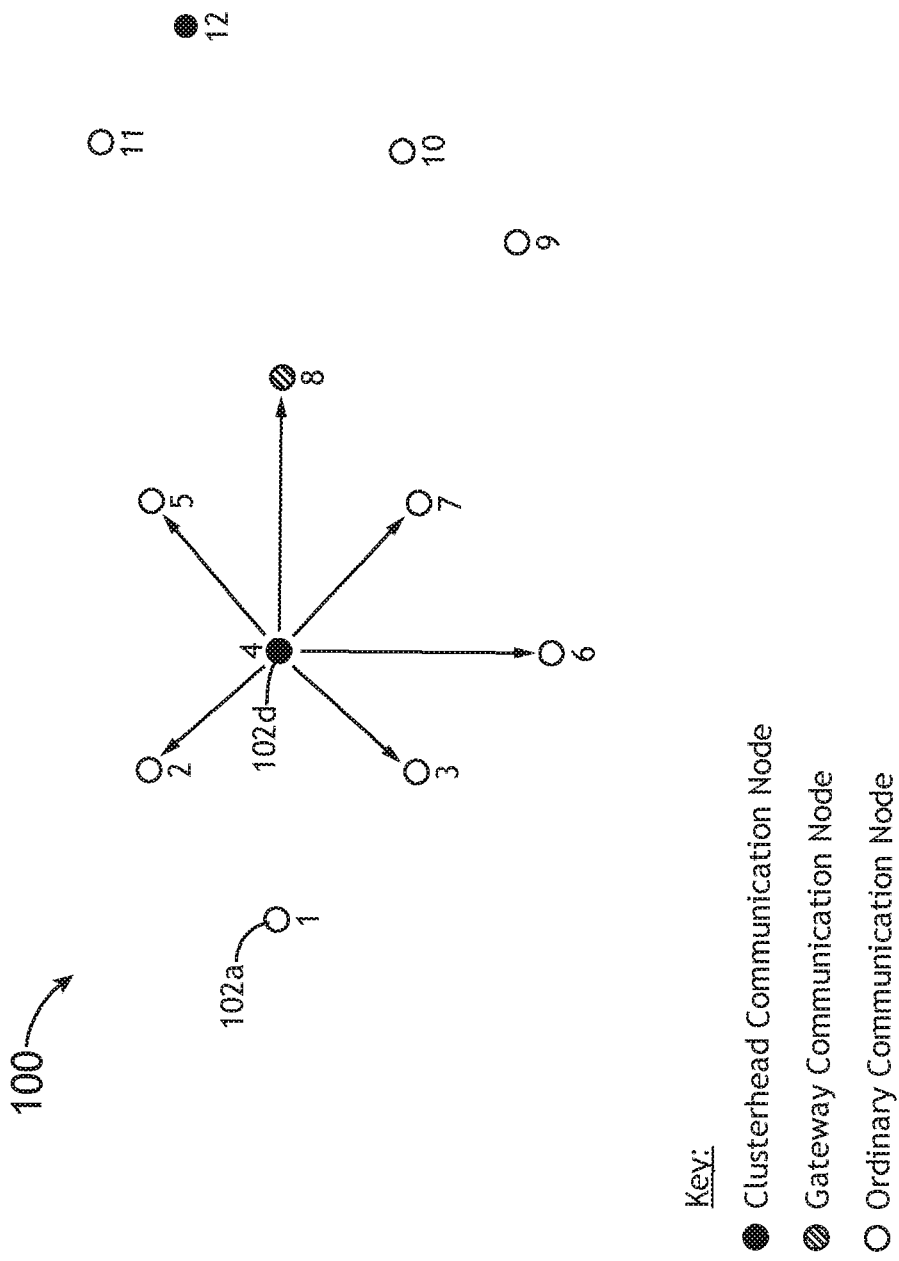
FIG. 3F illustrates a PLI request packet re-transmitted by a clusterhead communication node, in accordance with one or more embodiments of the present disclosure.

FIG. 3F illustrates a PLI request packet re-transmitted by a clusterhead communication node 102d, in accordance with one or more embodiments of the present disclosure.

As shown in FIG. 3F, the clusterhead communication node 102d may re-transmit the PLI request packet in a third iteration to the group of secondary communication nodes 102b, 102c, 102e, 102f, 102g, 102h. The re-transmitted PLI request packet may include a member list including a unique identifier associated with each communication node which previously and successfully transmitted a PLI report packet to the clusterhead communication node 102d. For example, the member list included with the PLI request packet sent in FIG. 3F may include unique identifiers associated with secondary communication nodes 102b, 102e, 102f (FIG. 3C) and secondary communication nodes 102c, 102h (FIG. 3E).

After re-transmitting the PLI request packet in a third iteration in FIG. 3F, the controller 104d of the clusterhead communication node 102d may be configured to collect PLI report packets for a third time interval $(\Delta t_3)$. The third time interval may commence upon re-transmission of the PLI request packet in the third iteration, and may be stored in memory 106*d*. For example, upon re-transmitting the PLI request packet in a third iteration (FIG. 3F), the controller 104*d* of the clusterhead communication node 102*d* may be configured to collect PLI report packets for a third time interval ($\Delta t_3$). As noted previously herein, the third time interval ($\Delta t_3$) may be less than the second time interval ($\Delta t_2$).

Figure 3G:
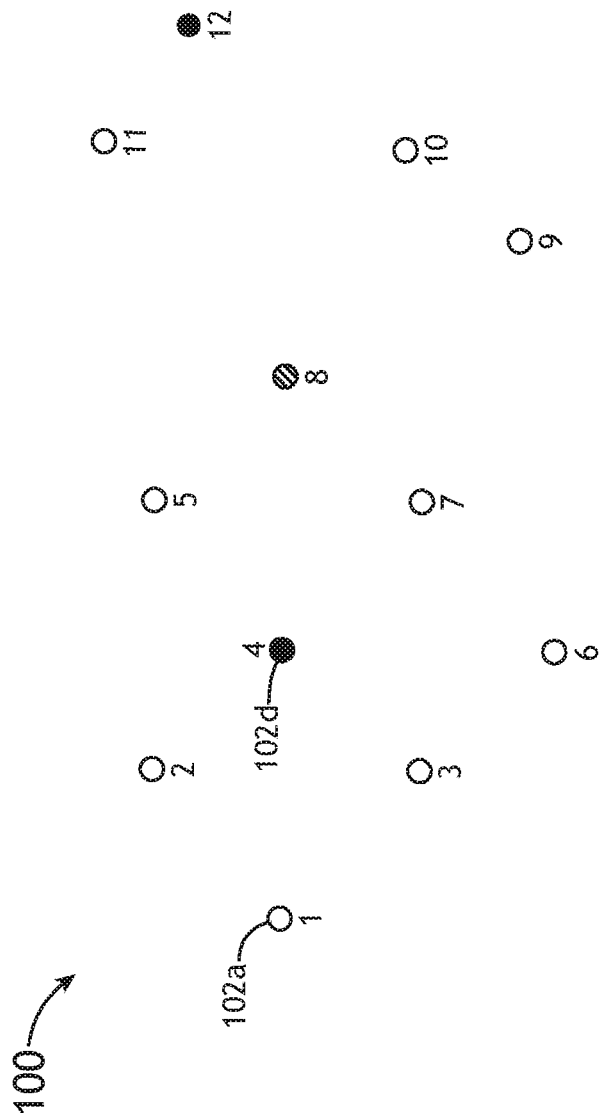
FIG. 3G illustrates a clusterhead node waiting for PLI report packets for a time interval, in accordance with one or more embodiments of the present disclosure.

In this example, as shown in FIG. 3G, the clusterhead communication node 102*d* may not receive any PLI report packets during the third time interval ($\Delta t_3$). Upon expiration of the third time interval ($\Delta t_3$), the method may again proceed to step 210. In a step 210, the controller 104*d* of the clusterhead communication node 102*d* may determine whether any new PLI report packets have been received. For example, the controller 104*d* may be configured to identify that no new PLI report packets were received in the third iteration by comparing the member list after second iteration to member list after the third iteration.

Upon determining that no PLI report packets have been received (e.g., step 210="NO"), method 200 may proceed to step 212. It is noted herein that the last iteration of transmitting the PLI request packet before no new PLI report packets are received (e.g., last iteration of step 208 before the answer to step 210 is "NO") may generally be referred to as the $N^{th}$ iteration. In the examples illustrated in FIGS. 3A-3G, there were three iterations of transmitting the PLI request packet (e.g., FIGS. 3B, 3D, 3F), thus the third iteration may be generally referred to as the $N^{th}$ iteration in this example, and the third time interval ($\Delta t_3$) may generally be referred to as the $N^{th}$ time interval ($\Delta t_N$). However, it is further noted that method 200 may repeat steps 208 and 210 any number of iterations, dependent upon the answer of step 210 after each iteration.

In a step 212, the controller 104*d* of the clusterhead communication node 102*d* may transmit a PLI publish packet. This may be further understood with reference to FIG. 3H.

Figure 3H:
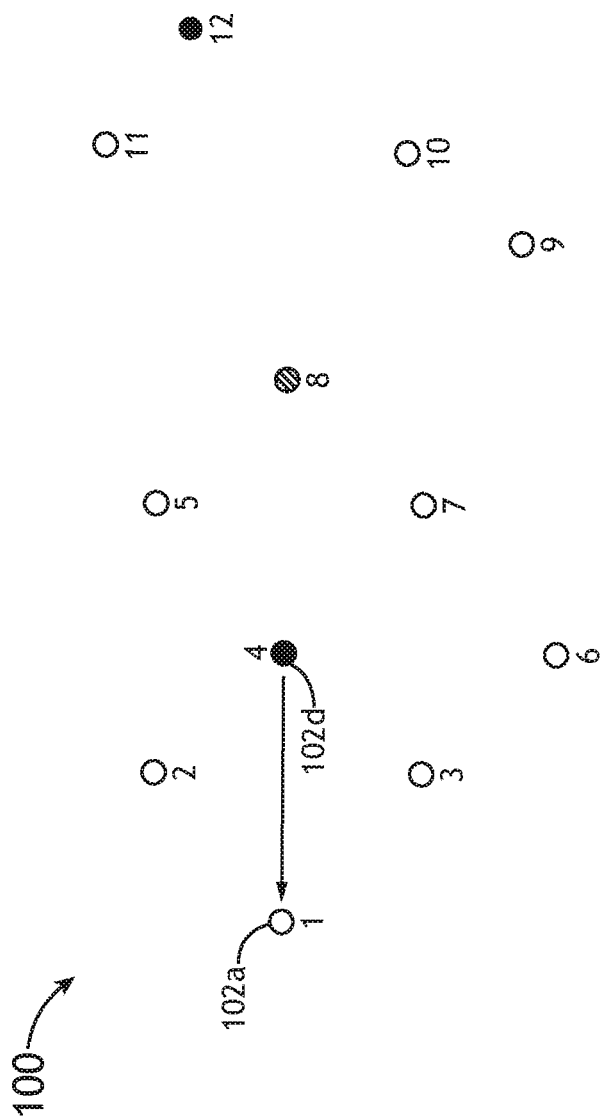
FIG. 3H illustrate a PLI publish packet transmitted from a clusterhead node to a control communication node, in accordance with one or more embodiments of the present disclosure.

FIG. 3H illustrates a PLI publish packet transmitted from a clusterhead node 102*d* to a control communication node 102*a*, in accordance with one or more embodiments of the present disclosure.

In step 212, the clusterhead communication node 102*d* may transmit a PLI publish packet, via the communication interface 108*d*, to the control communication node 102*a*. The term "PLI publish packet" may be used to refer to a data packet which includes collected positional information of one or more communication nodes 102 within the multi-node communication network 100. In embodiments, a PLI publish packet may include PLI data and unique identifiers associated with each acknowledged secondary communication node. In this regard, the PLI publish packet may include positional information and a unique identifier associated with each collected PLI report packet received.

In some embodiments, the clusterhead communication node 102 may additionally report its own PLI data, such that the PLI publish packet includes positional information and a unique identifier associated with the clusterhead communication node 102. Whether clusterhead communication nodes 102 report their own PLI data may be dependent upon whether the respective clusterhead communication nodes 102 meet all requesting characteristics associated with the PLI request packet from the control communication node 102, as will be described in further detail herein.

The PLI publish packet may be distributed/transmitted via any communication protocol known in the art. For example, as shown in FIG. 3H, the PLI publish packet may be transmitted from the clusterhead communication node 102*d* to the control communication node 102*a* via a unicasting (e.g., point-to-point) routing protocol. For instance, the PLI publish packet may be transmitted from the clusterhead communication node 102*d* to the control communication node 102*a* via a unicasting routing protocol utilizing a routing table.

By way of another example, the PLI publish packet may be distributed to the control communication node 102*a* and/or throughout the multi-node communication network 100 via a packet flooding procedure (e.g., EFPC, ZOEF, and the like). For instance, the clusterhead communication node 102*d* may be configured to transmit the PLI publish packet to the control communication node 102*a* and at least one additional communication node 102 of the multi-node communication network 100 via a packet flooding procedure (similar to that shown in FIG. 3B). It is contemplated herein that transmitting the PLI publish packet via a packet flooding procedure may allow PLI data contained within the PLI publish packet to be distributed to every communication node 102 within the multi-node communication network 100.

Reference will again be made to FIG. 2. In step 204, upon receiving a PLI request packet, each receiving communication node 102 may be configured to determine whether the receiving communication node 102 is a clusterhead communication node. This may be further understood with reference to FIG. 3B.

As shown in FIG. 3B, the secondary communication node 102*h* may receive the PLI request packet from the clusterhead communication node 102*d*. Upon receiving the PLI request packet, the controller 104*h* of the secondary communication node 102*h* may be configured to determine that the secondary communication node 102*h* is not a clusterhead communication node 102*h* (e.g., step 204="NO"). In this example, method 200 may then proceed to step 214.

In a step 214, the receiving communication node 102 may be configured to determine whether the receiving communication node 102 is a gateway communication node. If the answer to step 214 is "YES," method 200 may proceed to step 216. If the answer to step 214 is "NO," method 200 may proceed to step 218.

For example, as shown in FIG. 3C, the secondary communication node 102*h* may be configured to determine that the secondary communication node 102*h* is a gateway communication node 102*h* (e.g., step 214="YES"). In this example, method 200 may then proceed to step 216.

In a step 216, the gateway communication node 102 (e.g., secondary communication node 102*h*) may be configured to re-broadcast (e.g., re-transmit) the received PLI request packet. For example, as shown in FIG. 3C, upon determining the secondary communication node 102*h* is a gateway communication node 102*h* (e.g., step 214="YES"), the secondary communication node 102*h* may be configured to re-transmit (e.g., re-broadcast or relay) the received PLI request packet to one or more additional communication nodes 102. For instance, as shown in FIG. 3C, the secondary communication node 102*h* may be configured to re-transmit the PLI request packet to the communication nodes 102*i*, 102*j*, 102*k*, 102*l*. The PLI request packet may be re-transmitted or relayed by the gateway communication node (e.g., secondary communication node 102*h*) via any routing protocol known in the art including, but not limited to, a flooding routing protocol (e.g., EFPC, ZOEF).

If the answer to step 214 is "NO" and/or after step 216, it is determined whether PLI data is required from each receiving communication node 102. For example, after re-transmitting the PLI request packet in FIG. 3C, the controller 104*h* of the secondary communication node 102*h* may be configured to determine whether PLI data is requested and/or required from the secondary communication node 102*h*. By way of another example, upon receiving the PLI request packet in FIG. 3B, the secondary communication node 102*e* may be configured to determine it is not a clusterhead communication node (e.g., step 204="NO"), and that it is not a gateway communication node (e.g., step 214="NO"). Subsequently, the controller 104*e* of the secondary communication node 102*e* may be configured to determine whether PLI data is requested and/or required from the secondary communication node 102*e* in step 218.

In a step 218, each receiving communication node 102 may determine whether PLI data is required from the receiving communication node 102. For example, the controller 104*e* of the secondary communication node 102*e* may be configured to determine whether the secondary communication node 102*e* meets every requesting characteristic within the PLI request packet to determine whether PLI data is required from the secondary communication node 102*e*. The controller 104*e* may be configured to compare requesting characteristics within the PLI request packet to characteristics associated with the secondary communication node 102*e* which are stored in memory 106*e*. In embodiments, communication nodes 102 which meet all the requesting characteristics within the PLI request packet are required to report PLI data, whereas communication nodes 102 which do not meet one or more requesting characteristics within the PLI request packet are not required to report PLI data.

If the answer to step 218 is "NO," method 200 proceeds to step 224. In a step 224, the method 200 and terminates for the respective communication node 102. For example, if the secondary communication node 102*e* does not meet all the requesting characteristics within the PLI request packet such that its PLI data is not required (e.g., step 218="NO"), method 200 proceeds to step 224 and terminates with respect to the secondary communication node 102*e*.

If the answer to step 218 is "YES," method 200 proceeds to step 220. In a step 220, each receiving communication node 102 for which PLI data is required may be configured to transmit a PLI report packet to the primary clusterhead communication node 102.

For example, if the controller 104*e* of the secondary communication node 102*e* determines it meets every requesting characteristics of the PLI request packet such that its PLI data is required (e.g., step 218="YES"), the secondary communication node 102*e* may transmit a PLI report packet to the clusterhead communication node 102*d*, as shown in FIG. 3C.

It is noted herein that a single communication node 102 may receive a PLI request packet from a plurality of clusterhead communication nodes 102. For the purposes of the present disclosure, the "primary" clusterhead communication node 102 for each respective communication node 102 may be regarded as the first clusterhead communication node 102 from which the respective communication node 102 received a PLI request packet. For example, if the secondary communication node 102*e* first received the PLI request packet from the clusterhead communication node 102*d*, and subsequently received a PLI request packet from a clusterhead communication node 102*z*, the clusterhead communication node 102*d* may be the "primary" clusterhead communication node 102*d* for the purposes of the secondary communication node 102*e*.

It is further noted herein that transmitting a PLI report packet to the clusterhead communication node 102*h* in step 220 may include transmitting the PLI report packet directly and/or indirectly to the clusterhead communication node 102*d*. For example, as shown in FIG. 3C, the secondary communication node 102*e* may transmit a PLI report packet directly to the clusterhead communication node 102*d*. By way of another example, the secondary communication node 102*i* may transmit a PLI report packet indirectly to the clusterhead communication node 102*d* through the gateway secondary communication node 102*h*.

Upon transmitting a PLI report packet in step 220, the transmitting communication nodes 102 may be configured to wait for a member list back from the associated primary clusterhead communication node 102. For example, upon transmitting a PLI report packet in FIG. 3C, the secondary communication node 102*e* may subsequently receive a subsequent PLI request packet in a subsequent iteration (FIG. 3D), wherein the subsequent PLI request packet includes a member list. As noted previously herein, a member list may include a list of unique identifiers associated with each communication node 102 which previously and successfully transmitted a PLI report packet to the clusterhead communication node 102*d*.

Upon receiving a member list (e.g., receiving a PLI request packet in a subsequent iteration, wherein the PLI request packet includes a member list), method 200 may proceed to step 222.

In a step 222, each communication node 102 may be configured to determine whether the communication node 102 is included within the member list. For example, upon receiving the PLI request packet including a member list in FIG. 3D, the controller 104*e* of the secondary communication node 102*e* may be configured to determine that the communication node 102*e* is included within the member list (e.g., that a unique identifier associated with the secondary communication node 102*e* is included within the member list). In this example, the controller 104*e* may be configured to determine the answer to step 222 is "YES." Upon determining that the answer to step 222 is "YES," method 200 may terminate with respect to that respective communication node 102 such that it does not have to respond to subsequent PLI request packets. For example, upon determining that the answer to step 222 is "YES," the communication node 102*e* may not respond to subsequent PLI request packets received in FIG. 3D and FIG. 3F (as shown in FIG. 3E and FIG. 3G).

If a communication node 102 which previously transmitted a PLI report packet is not included within a subsequently received member list (e.g., step 222="NO"), method 200 may return to step 220. By re-transmitting a PLI report packet in subsequent iterations, communication nodes 102 may increase the likelihood that PLI data may be successfully collected and returned to the clusterhead communication node 102*d* and control communication node 102*a*.

Figure 4:
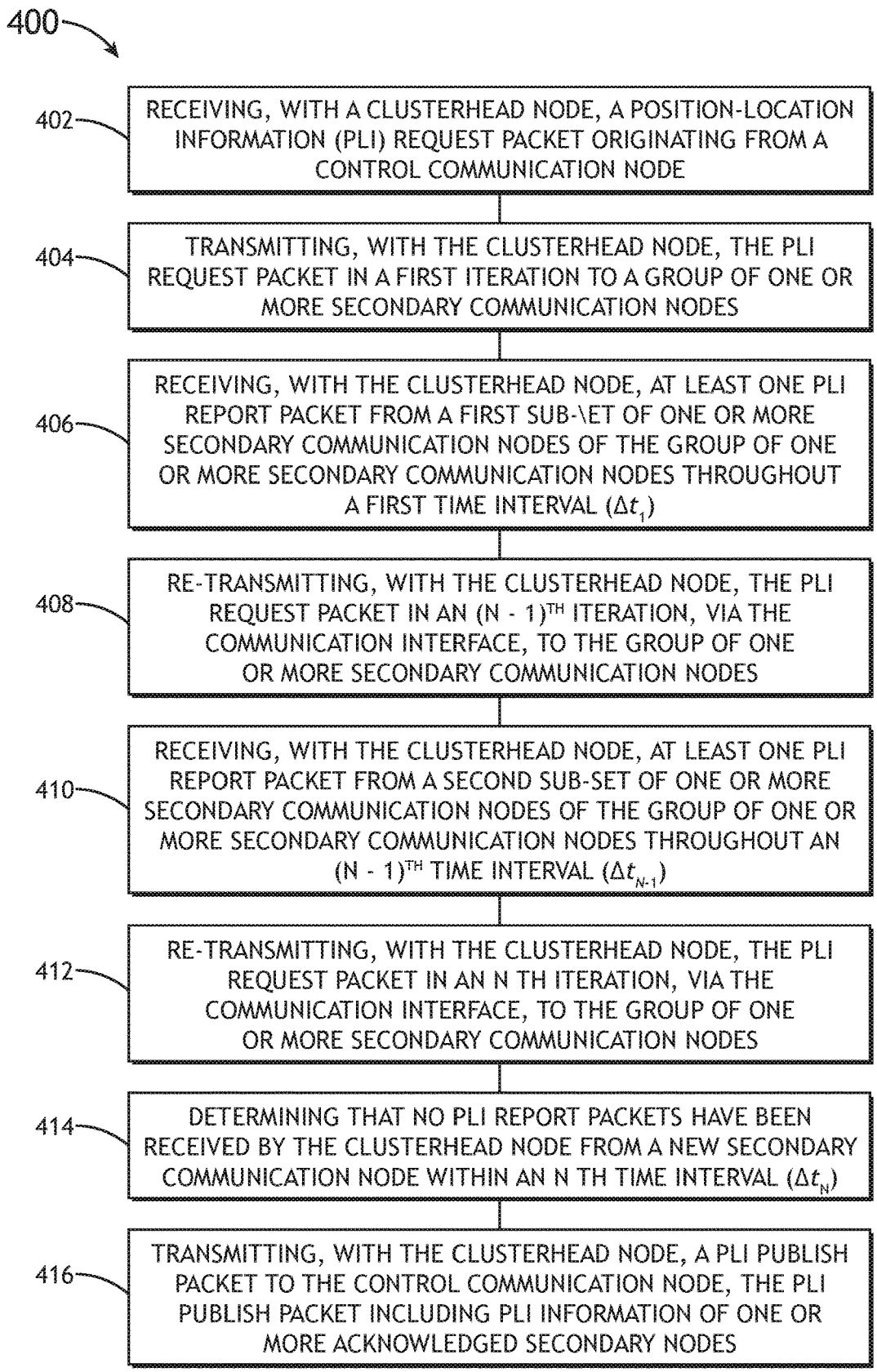
FIG. 4 illustrates a flowchart of a method for distributing PLI data within a multi-node communication network, in accordance with one or more embodiments of the present disclosure.

FIG. 4 illustrates a flowchart of a method 400 for distributing PLI data within a multi-node communication network 100, in accordance with one or more embodiments of the present disclosure. It is noted herein that the steps of method 400 may be implemented all or in part by multi-node communication network 100. It is further recognized, however, that the method 400 is not limited to the multi-node communication network 100 in that additional or alternative system-level embodiments may carry out all or part of the steps of method 400.

In a step 402, a position-location information (PLI) request packet originating from a control communication node is received by a clusterhead communication node. For example, as shown in FIG. 3A, a clusterhead communication node 102d may receive a PLI request packet from a control communication node 102a.

In a step 404, the PLI request packet is transmitted, in a first iteration, to a group of one or more secondary communication nodes. For example, as shown in FIG. 3B, the clusterhead communication node 102d may transmit the PLI request packet to a group of one or more secondary communication nodes 102b, 102c, 102e, 102f, 102g, 102h.

In a step 406, at least one PLI report packet is received from a first sub-set of one or more secondary communication nodes of the group of one or more secondary communication nodes throughout a first time interval ($\Delta t_1$). For example, as shown in FIG. 3C, the clusterhead communication node 102c may receive PLI report packets from secondary communication nodes 102b, 102e, 102f during a first time interval ($\Delta t_1$).

In a step 408, the PLI request packet is transmitted, in an $(N-1)^{th}$ iteration, to the group of one or more secondary communication nodes. For example, as shown in FIG. 3D, the clusterhead communication node 102d may re-transmit the PLI request packet to the group of one or more secondary communication nodes 102b, 102c, 102e, 102f, 102g, 102h. In embodiments, the PLI request packet may include a member list including a list of one or more acknowledged secondary communication nodes.

In a step 410, at least one PLI report packet is received from a second sub-set of one or more secondary communication nodes of the group of one or more secondary communication nodes throughout an $(N-1)^{th}$ time interval ($\Delta t_{N-1}$). For example, as shown in FIG. 3E, the clusterhead communication node 102d may receive additional PLI report packets from secondary communication nodes 102c, 102h.

In a step 412, the PLI request packet is transmitted, in an $N^{th}$ iteration, to the group of one or more secondary communication nodes. For example, as shown in FIG. 3F, the clusterhead communication node 102d may re-transmit a PLI request packet to the group of one or more secondary communication nodes 102b, 102c, 102e, 102f, 102g, 102h.

In a step 414, it is determined that no PLI report packets have been received by the clusterhead node from a new secondary communication node within an $N^{th}$ time interval ($\Delta t_N$). For example, as shown in FIG. 3G, no new PLI report packets may be received by any new secondary communication nodes 102 within the $N^{th}$ time interval ($\Delta t_N$).

In a step 416, a PLI publish packet is transmitted to the control communication node. In embodiments, the PLI publish packet may include PLI information of one or more acknowledged secondary nodes. For example, as shown in FIG. 3H, the clusterhead communication node 102d may transmit a PLI publish packet to the control communication node 102a.

Figure 5:
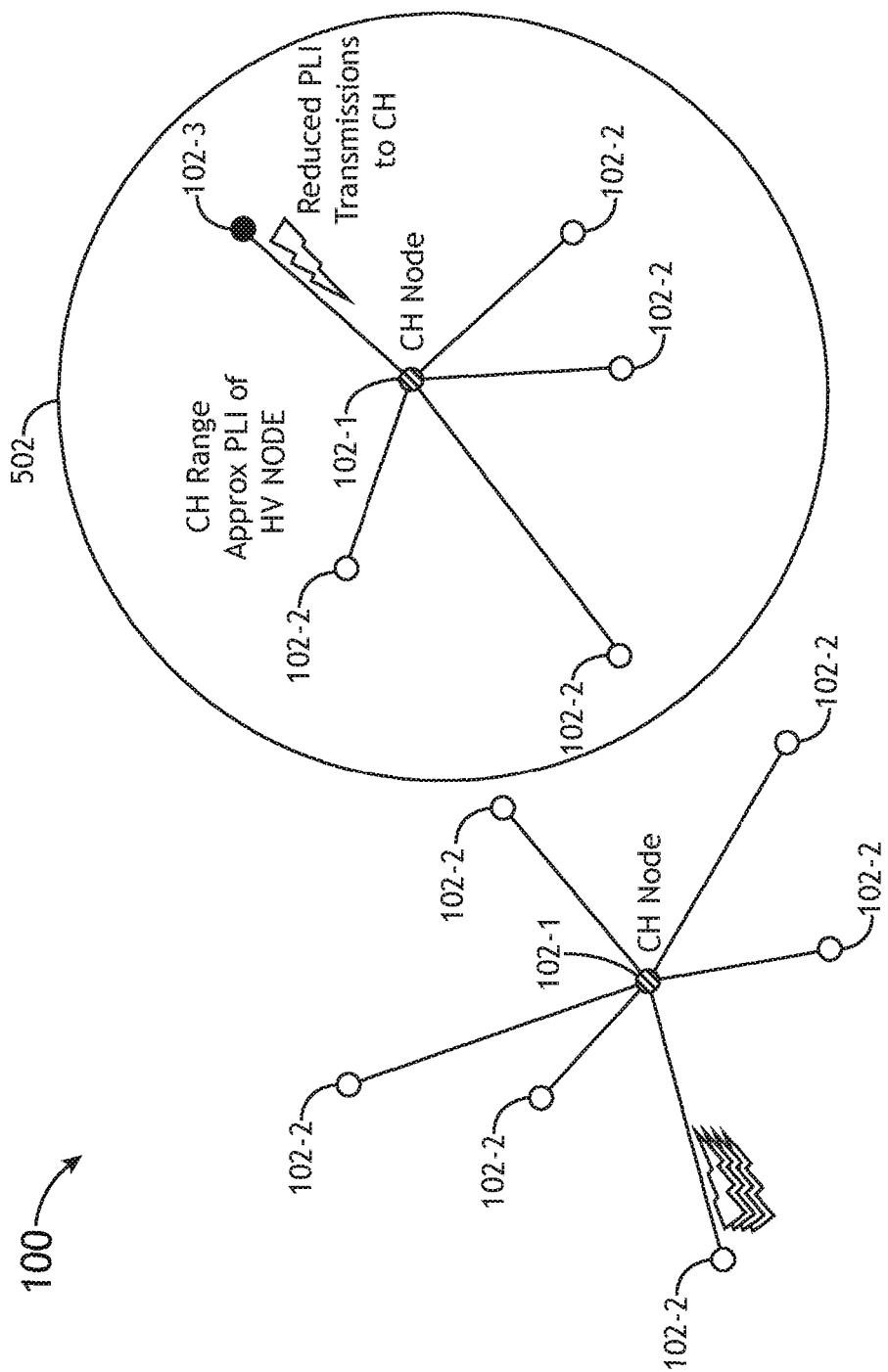
FIG. 5 illustrates a multi-node communication network including a high value node, in accordance with one or more embodiments of the present disclosure.

FIG. 5 illustrates an exemplary multi-node communication network 100, in accordance with one or more embodiments of the present disclosure. In some embodiments, the multi-node communication network 100 may include a plurality of nodes (e.g., communication nodes 102). For example, the multi-node communication network 100 may include at least one clusterhead node 102-1, normal value nodes 102-2, and at least one high value node 102-3. Each of the at least one clusterhead node 102-1 may be one of the normal value nodes 102-2. The high value node 102-3 may be defined as high value relative to the normal value nodes 102-2 during mission data fill.

A node 102 may be an endpoint within a communication network 100. For example, a node can be a radio device carried by a soldier or installed in a location or vehicle.

A high value node 102-3 may be a node within the communication network 100 that is considered to have a higher level of monetary or operational value to the network 100. Examples may include high-cost vehicles or important communications gateways.

A normal value node may be a node within the communication network 100 that is not considered to have a higher level of monetary or operational value to the network 100. Examples may include attritable Unmanned Aerial Vehicles (UAVs) or standalone radios in unmanned locations.

A clusterhead node 102-1 may be a node within the communication network 100 utilized to aggregate and distribute information of several nearby nodes 102.

PLI may be data detailing the physical location, speed and direction of a node 102 within the communication network 100.

A communication gateway may be a node connected to multiple networks allowing for the flow of communication between those connections.

Mission data fill may be mission-specific information that is loaded into a node 102 prior to deployment for a mission.

For example, network topology may change as nodes 102 physically move around a battlefield. As described, these nodes 102 may self-register with a local clusterhead node 102-1, which may be responsible for aggregating and distributing the PLI of the clusterhead node's 102-1 members. Some embodiments are configured to allow for stealth PLI methods to obfuscate the PLI of high value nodes 102-3. Stealth PLI may reduce the risk of exposure of PLI for high value nodes 102-3.

In some embodiments, nodes 102 may be identified or tagged as high value nodes 102-3 prior to deployment. This can be done during the mission data fill process where mission-specific information is loaded for each node 102. When a node 102 has been marked as a high value node 102-3, the high value node's 102-3 behavior in responding to PLI requests or periodic PLI distributions may be changed to protect PLI information from being intercepted by an adversary.

In most instances, the actual PLI of the high value node 102-3 may not be distributed across the network 100. The high value node's 102-3 attached clusterhead node 102-1 may distribute the PLI of the clusterhead node 102-1 as well as a listing of nodes 102 belonging to the clusterhead node 102-1. The receiving nodes 102 can then approximate the location of the high value node 102-3 node by knowing the location of the clusterhead node 102-1 and that the high value node 102-3 must be within range 502 of the clusterhead node 102-1.

If the PLI exchange is intercepted and existing countermeasures are successfully attacked, an enemy may still not be able to identify the precise location of the high value node 102-3 to attack it. In essence, the use of the clusterhead node 102-1 and approximated PLI for the high value node 102-3 may hide the true location of the high value node 102-3. For this reason, a high value node 102-3 should not act as a clusterhead node 102-1.

Using clusterhead nodes 102-1 to disseminate approximated PLI for the high value node 102-3 may also reduce the number of times the high value node 102-3 needs to respond to PLI requests. The high value node 102-3 can remain silent on PLI for the majority of the time only transmitting when clusterhead node 102-1 registration changes. The reduced frequency of transmissions may also reduce the risk of detection by an enemy.

Typically, this level of PLI precision for the high value node 102-3 will be acceptable for the high value node 102-3 the majority of the time. However, there may be times when time-critical or high-precision PLI for the high value node 102-3 is needed by the network 100. For example, when calling for an airstrike, precise PLI is typically needed to ensure the safety of the high value node 102-3. In these cases, the high value node 102-3 may still be capable of responding to a network request with full-precision PLI.

The normal value nodes 102-2 and the high value node 102-3 may be self-registered with clusterhead nodes 102-1. The high value node 102-3 node may be "hidden" behind the structure of the clusterhead node 102-1. PLI transmissions from the high value node 102-3 may be targeted to the clusterhead node 102-1 upon registration with the clusterhead node 102-1. The remainder of the time, this high value node 102-3 may remain silent during PLI requests allowing the clusterhead node 102-1 to transmit approximate PLI information for the high value node 102-3. This will inform receiving nodes 102 that the high value node 102-3 is within range of the clusterhead node 102-1, but will not provide precise location of the high value node 102-3.

For example, a node 102 may be identified as a high value node 102-3 during mission data fill. Nodes 102 may be deployed to the field. The high value node 102-3 may locate a local clusterhead node 102-1 and register the high value node's 102-3 membership including current PLI. The high value node's 102-3 membership may stay active unless the high value node 102-3 re-registers with a different clusterhead node 102-1. When a PLI request is issued on the network 100, normal value nodes 102-2 may send current PLI to the clusterhead node 102-1. If request is for reliable PLI, normal value nodes 102-2 may wait for confirmation of membership from the clusterhead node 102-1 (e.g., by waiting for receipt of member list). The clusterhead node 102-1 may wait for PLI responses from normal value nodes 102-2, aggregate the data into a member list, and distribute the information to the network 100. If request is for reliable PLI, the clusterhead node 102-1 may confirm membership with normal value nodes 102-2 (e.g., by sending member list). However, when a PLI request is issued on the network 100, the high value node 102-3 may remain silent, as the high value node 102-3 is already in the member list of the clusterhead node 102-1 and does not need to send additional PLI. Nodes 102 receiving the response from the PLI request can now identify the location of the clusterhead node 102-1 and the clusterhead node's 102-1 member list. The high value node 102-3 will be in the member list allowing for other nodes 102 to know the approximate PLI without exposing the precise PLI for the high value node 102-3.

For example, when a time-critical or high-precision PLI request is issued on the network 100, the normal value nodes 102-2, the clusterhead node 102-1, and the high value node 102-3 may respond to destination(s) with updated PLI. Nodes 102 receiving the response from the PLI request, can now identify the precise location of all nodes 102, including the high value node 102-3.

In some embodiments, the high value node 102-3 may be configured to locate the clusterhead node 102-1, register the high value node's 102-3 membership to the clusterhead node 102-1, and send position-location information (PLI) to the clusterhead node 102-1 during registration. Upon receipt of a PLI request, each of the normal value nodes 102-2 may be configured to send current PLI to the clusterhead node 102-1. Upon receipt of the PLI request, the high value node 102-3 may remain silent. The high value node's 102-3 membership to the clusterhead node 102-1 may stay active unless the high value node 102-3 re-registers with a different clusterhead node 102-1, whereas a particular normal value node 102-2 may be removed from membership with the clusterhead node 102-1 if the clusterhead node 102-1 fails to receive current PLI from the particular normal value node 102-2 upon receipt of a particular PLI request. The high value node 102-3 may send the high value node's 102-3 current PLI less often than the normal value nodes 102-2 send the normal value nodes' 102-2 current PLIs. The clusterhead node 102-1 may be configured to receive the current PLIs from the normal value nodes 102-2, aggregate the current PLIs into a member list, and distribute the member list to the network 100, wherein the member list may include information that the high value node 102-3 is a member of the clusterhead node 102-1. The normal value nodes 102-2 may be configured to receive the member list from the clusterhead node 102-1 and determine an approximate location of the high value node 102-3 based at least on the high value node 102-3 being in range 502 of the clusterhead node 102-1. Each of the clusterhead node 102-1, the normal value nodes 102-2, and the high value node 102-3 may be configured to send current PLI upon receipt of a time-critical PLI request. Each of the clusterhead node 102-1, the normal value nodes 102-2, and the high value node 102-3 may be configured to send current PLI upon receipt of a high-precision PLI request.

Some embodiments include a method of providing additional protection to high value nodes 102-3 within the network 100 by reducing PLI transmissions and typically only providing approximate PLI for the high value nodes 102-3, thus making probability of detection and intercept by an enemy much lower. This may translate into lower monetary and tactical losses for a military customer.

Figure 6:
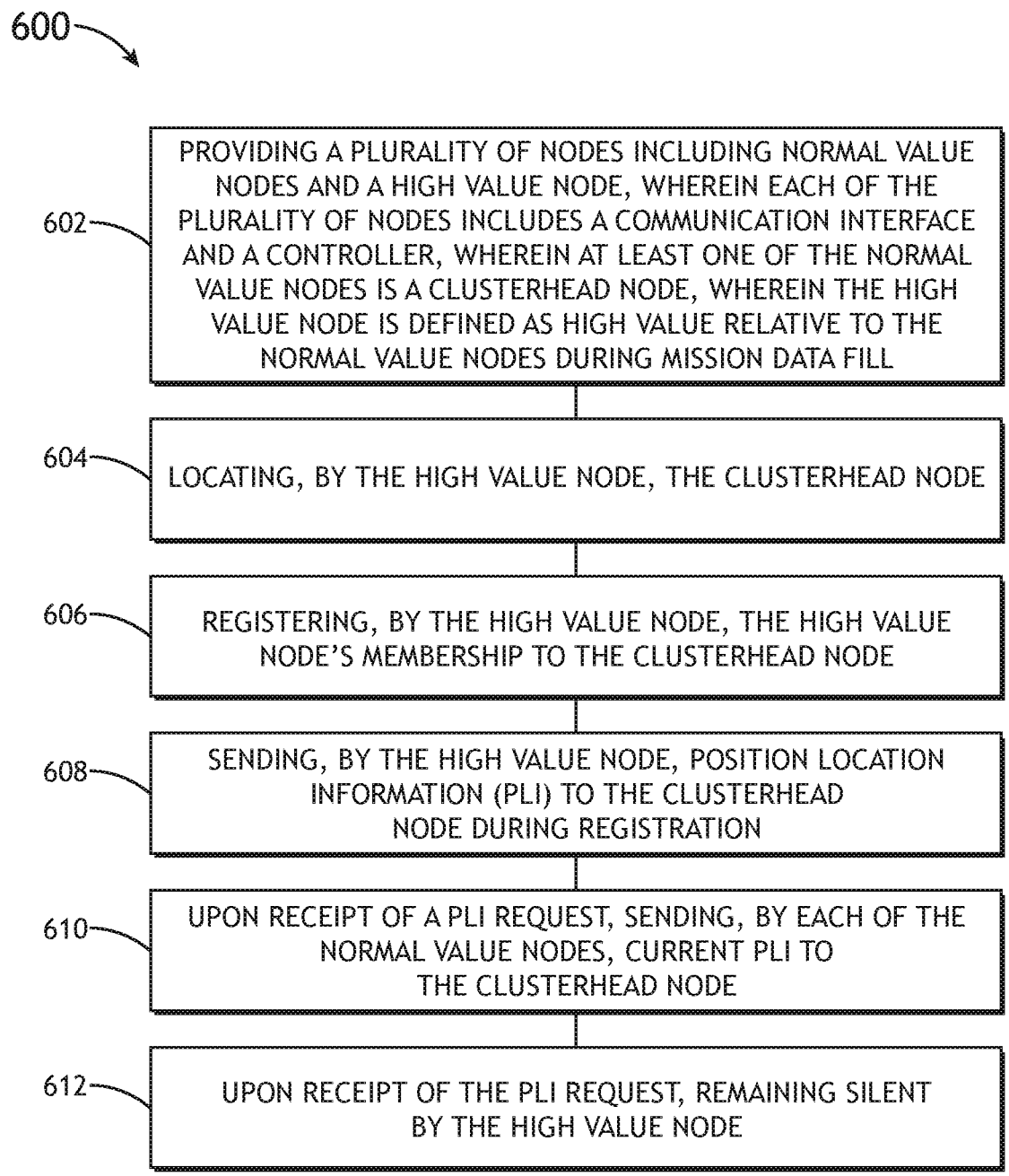
FIG. 6 illustrates a flowchart of a method, in accordance with one or more embodiments of the present disclosure.

Referring now to FIG. 6, an exemplary embodiment of a method 600 according to the inventive concepts disclosed herein may include one or more of the following steps. Additionally, for example, some embodiments may include performing one or more instances of the method 600 iteratively, concurrently, and/or sequentially. Additionally, for example, at least some of the steps of the method 600 may be performed in parallel and/or concurrently. Additionally, in some embodiments, at least some of the steps of the method 600 may be performed non-sequentially.

A step 602 may include providing a plurality of nodes including normal value nodes, a clusterhead node, and a high value node, wherein each of the plurality of nodes includes a communication interface and a controller, wherein the high value node is defined as high value relative to the normal value nodes during mission data fill.

A step 604 may include locating, by the high value node, the clusterhead node.

A step 606 may include registering, by the high value node, the high value node's membership to the clusterhead node.

A step 608 may include sending, by the high value node, position location information (PLI) to the clusterhead node during registration.

A step 610 may include upon receipt of a PLI request, sending, by each of the normal value nodes, current PLI to the clusterhead node.

A step 612 may include upon receipt of the PLI request, remaining silent by the high value node.

Further, the method 600 may include any of the operations disclosed throughout.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A multi-node communication network, comprising:
a plurality of nodes including normal value nodes, a clusterhead node, and a high value node, wherein each of the plurality of nodes includes a communication interface and a controller, wherein the high value node is defined as high value relative to the normal value nodes during mission data fill;
wherein the high value node is configured to locate the clusterhead node, register the high value node's membership to the clusterhead node, and send position-location information (PLI) to the clusterhead node during registration;
wherein, upon receipt of a PLI request, each of the normal value nodes is configured to send current PLI to the clusterhead node;
wherein, upon receipt of the PLI request, the high value node remains silent.

2. The multi-node communication network of claim 1, wherein the high value node's membership to the clusterhead node stays active unless the high value node re-registers with a different clusterhead node.

3. The multi-node communication network of claim 2, wherein a particular normal value node is removed from membership with the clusterhead node if the clusterhead node fails to receive current PLI from the particular normal value node upon receipt of a particular PLI request.

4. The multi-node communication network of claim 1, wherein the high value node send the high value node's current PLI less often than the normal value nodes send the normal value nodes' current PLIs.

5. The multi-node communication network of claim 1, wherein the clusterhead node is configured to receive the current PLIs from the normal value nodes, aggregate the current PLIs into a member list, and distribute the member list to the network, wherein the member list includes information that the high value node is a member of the clusterhead node.

6. The multi-node communication network of claim 5, wherein the normal value nodes are configured to receive the member list from the clusterhead node and determine an approximate location of the high value node based at least on the high value node being in range of the clusterhead node.

7. The multi-node communication network of claim 1, wherein each of the clusterhead node, the normal value nodes, and the high value node are configured to send current PLI upon receipt of a time-critical PLI request.

8. The multi-node communication network of claim 1, wherein each of the clusterhead node, the normal value nodes, and the high value node are configured to send current PLI upon receipt of a high-precision PLI request.

9. A method of operating a multi-node communication network, comprising:
providing a plurality of nodes including normal value nodes, a clusterhead node, and a high value node, wherein each of the plurality of nodes includes a communication interface and a controller, wherein the high value node is defined as high value relative to the normal value nodes during mission data fill;
locating, by the high value node, the clusterhead node;
registering, by the high value node, the high value node's membership to the clusterhead node;
sending, by the high value node, position location information (PLI) to the clusterhead node during registration;
upon receipt of a PLI request, sending, by each of the normal value nodes, current PLI to the clusterhead node; and
upon receipt of the PLI request, remaining silent by the high value node.

10. The method of claim 9, wherein the high value node's membership to the clusterhead node stays active unless the high value node re-registers with a different clusterhead node.

11. The multi-node communication network of claim 10, wherein a particular normal value node is removed from membership with the clusterhead node if the clusterhead node fails to receive current PLI from the particular normal value node upon receipt of a particular PLI request.

12. The method of claim 9, wherein the high value node send the high value node's current PLI less often than the normal value nodes send the normal value nodes' current PLIs.

13. The method of claim 9, wherein the clusterhead node is configured to receive the current PLIs from the normal value nodes, aggregate the current PLIs into a member list, and distribute the member list to the network, wherein the member list includes information that the high value node is a member of the clusterhead node.

14. The multi-node communication network of claim 13, wherein the normal value nodes are configured to receive the member list from the clusterhead node and determine an approximate location of the high value node based at least on the high value node being in range of the clusterhead node.

15. The method of claim 9, wherein each of the clusterhead node, the normal value nodes, and the high value node are configured to send current PLI upon receipt of a time-critical or high-precision PLI request.

* * * * *